(12) United States Patent
Barnett et al.

(10) Patent No.: US 10,916,258 B2
(45) Date of Patent: Feb. 9, 2021

(54) AUDIO CHANNEL MONITORING BY VOICE TO KEYWORD MATCHING WITH NOTIFICATION

(71) Applicants: Richard E. Barnett, Newton, MA (US); Terence Sean Sullivan, Corvallis, MT (US)

(72) Inventors: Richard E. Barnett, Newton, MA (US); Terence Sean Sullivan, Corvallis, MT (US)

(73) Assignee: Telegraph Peak Technologies, LLC, Ely, NV (US)

( * ) Notice: Subject to any disclaimer, the term of this patent is extended or adjusted under 35 U.S.C. 154(b) by 57 days.

(21) Appl. No.: 15/639,738

(22) Filed: Jun. 30, 2017

(65) Prior Publication Data

US 2019/0005978 A1 Jan. 3, 2019

(51) Int. Cl.
| | |
|---|---|
| *G10L 15/00* | (2013.01) |
| *G10L 15/26* | (2006.01) |
| *G10L 21/10* | (2013.01) |
| *G06F 3/16* | (2006.01) |
| *G10L 15/08* | (2006.01) |

(Continued)

(52) U.S. Cl.
CPC ............. *G10L 21/10* (2013.01); *G06F 3/165* (2013.01); *G06F 40/279* (2020.01); *G06Q 30/0201* (2013.01); *G06Q 50/26* (2013.01); *G10L 15/08* (2013.01); *G10L 15/26* (2013.01); *G10L 15/30* (2013.01); *G10L 21/18* (2013.01); *G10L 25/51* (2013.01); *G10L 2015/088* (2013.01); *H04W 4/90* (2018.02); *H04W 88/02* (2013.01)

(58) Field of Classification Search
CPC ......... H04M 2201/40; H04M 3/42221; H04M 2201/18; H04M 2201/405; H04M 2203/6009; H04M 2242/12; H04M 3/2281; H04M 1/2535; H04M 1/656; H04M 3/2218; H04M 2203/306; H04M 3/36; H04M 3/42382; G10L 2015/088; G10L 15/1822; G10L 15/26; G10L 15/08; G10L 15/18; G10L 25/63; G10L 15/04; G10L 15/1815; G10L 19/018; G10L 25/57; G06F 17/30746; H04H 60/43; H04H 60/31; H04H 60/37; H04H 60/46; H04H 60/58; H04L 65/60; H04L 65/601; H04L 67/22

See application file for complete search history.

(56) References Cited

U.S. PATENT DOCUMENTS

| | | |
|---|---|---|
| 6,366,651 B1 | 4/2002 | Griffith et al. |
| 6,718,308 B1 | 4/2004 | Nolting |

(Continued)

*Primary Examiner* — Michael Ortiz-Sanchez
(74) *Attorney, Agent, or Firm* — Dan Brown Law Office; Daniel R. Brown

(57) ABSTRACT

Systems and methods of monitoring communications channels and automatically providing selective notifications through a network that messages containing useful information, transmitted in the form of voice content, have been received. Keywords are compared with textual data transcribed from voice messages receive on a channel. The textual data and the keywords are compared, and upon identifying a correlation therebetween, a notification is automatically generated that indicates receipt of a given message, the existence of the correlation with the keywords, and an identity of the channel, so that client terminals can receive the message and also receive subsequent or related messages.

52 Claims, 7 Drawing Sheets

(51) Int. Cl.
*G10L 25/51* (2013.01)
*G10L 21/18* (2013.01)
*G10L 15/30* (2013.01)
*G06Q 50/26* (2012.01)
*G06Q 30/02* (2012.01)
*G06F 40/279* (2020.01)
*H04W 88/02* (2009.01)
*H04W 4/90* (2018.01)

(56) References Cited

U.S. PATENT DOCUMENTS

| | | | |
|---|---|---|---|
| 7,106,843 B1 * | 9/2006 | Gainsboro | H04M 3/2281 379/191 |
| 7,330,536 B2 * | 2/2008 | Claudatos | H04M 3/42221 370/259 |
| 7,458,013 B2 | 11/2008 | Fruchter et al. | |
| 7,499,531 B2 * | 3/2009 | Claudatos | H04M 3/42221 379/68 |
| 7,631,042 B2 | 12/2009 | Chen et al. | |
| 7,734,562 B1 | 6/2010 | Hairman | |
| 7,836,183 B1 | 11/2010 | Barnett et al. | |
| 7,983,706 B2 | 7/2011 | Wolter | |
| 8,060,565 B1 | 11/2011 | Swartz | |
| 8,125,988 B1 | 2/2012 | Sullivan et al. | |
| 8,429,287 B2 | 4/2013 | Sullivan | |
| 8,509,408 B2 | 8/2013 | Goodman et al. | |
| 8,606,576 B1 * | 12/2013 | Barr | G10L 15/22 379/88.01 |
| 8,650,031 B1 * | 2/2014 | Mamou | G10L 15/08 704/235 |
| 8,856,267 B2 | 10/2014 | Sullivan et al. | |
| 8,874,070 B2 | 10/2014 | Basore et al. | |
| 8,898,329 B1 | 11/2014 | Sullivan | |
| 9,020,469 B2 | 4/2015 | Sullivan | |
| 9,313,330 B1 * | 4/2016 | Cordell | H04M 3/4936 |
| 9,351,142 B2 | 5/2016 | Basore et al. | |
| 9,391,676 B2 | 7/2016 | Sullivan | |
| 9,485,354 B1 * | 11/2016 | Flaks | H04M 3/367 |
| 2008/0086539 A1 * | 4/2008 | Bloebaum | G06F 17/30746 709/217 |
| 2009/0281897 A1 * | 11/2009 | Antos | G06F 17/30746 705/14.45 |
| 2010/0153572 A1 * | 6/2010 | Feig | H04H 20/82 709/231 |
| 2011/0060591 A1 * | 3/2011 | Chanvez | H04M 3/2281 704/270 |
| 2012/0209605 A1 * | 8/2012 | Hurvitz | G06F 17/30746 704/235 |
| 2013/0254308 A1 * | 9/2013 | Rose | H04N 21/252 709/206 |
| 2014/0019133 A1 * | 1/2014 | Bao | G10L 15/22 704/257 |
| 2014/0343936 A1 * | 11/2014 | Thapar | G06Q 10/109 704/235 |
| 2015/0073790 A1 * | 3/2015 | Steuble | G10L 15/26 704/235 |
| 2015/0106091 A1 * | 4/2015 | Wetjen | G10L 15/26 704/235 |
| 2015/0149171 A1 * | 5/2015 | Goldman | G10L 15/26 704/235 |
| 2015/0195406 A1 * | 7/2015 | Dwyer | H04M 3/5175 379/265.07 |
| 2015/0356836 A1 * | 12/2015 | Schlesinger | G08B 3/10 704/235 |
| 2016/0140965 A1 * | 5/2016 | Kumar | G10L 15/26 704/9 |
| 2016/0267128 A1 * | 9/2016 | Dumoulin | G06F 17/30401 |
| 2017/0186432 A1 * | 6/2017 | Aleksic | G10L 15/07 |
| 2018/0034961 A1 * | 2/2018 | Engelke | G10L 15/265 |
| 2018/0233052 A1 * | 8/2018 | Shamasundar | G08G 5/06 |

* cited by examiner

@ Message Received Time

@ Transcription & Notification

@ Playback Time

AUDIO CHANNEL MONITORING BY VOICE TO KEYWORD MATCHING WITH NOTIFICATION

BACKGROUND OF THE INVENTION

Related Applications

None.

Field of the Invention

The present disclosure relates to audio channel monitoring with notification. More particularly, the present disclosure relates to audio channel monitoring using voice to text conversion and keyword comparison, to notify users of network connected client terminals that messages containing useful information have been communicated through such channels, and are presently available for access.

Description of the Related Art

The inventors of the present disclosure have been granted a range of U.S. patents generally directed to the monitoring of public safety, government, and business radio systems, and the integration of such monitoring with Internet communications. This body of knowledge contemplates the transition of traditional radio scanner monitoring of such services into the ability to distribute messages received over radio through the Internet, including delivery to user client terminals, recording messages, selective playback, and archiving of such messages. The following U.S. patents, each having an element of common inventorship with the present disclosure, are germane to the present disclosure, and each of the following listed patents is hereby incorporated by reference thereto into the present disclosure, for all purposes. Hereinafter, these patents will be referred to as the "Inventors' Prior Patents".

U.S. Pat. No. 7,836,183 to Barnett et al. for Internet Audio Scanner and Method, issued Nov. 16, 2010. This patent includes disclosure related to scanning plural Internet audio channels in a manner similar to scanning radio channels.

U.S. Pat. No. 8,125,988 to Sullivan et al. for Network Audio Terminal and Method, issued Feb. 28, 2012. This patent includes disclosure related to capturing radio broadcasts by a network connected terminal, and forwarding directory packets that indicate the identity of the channel captured, the time of capture, and an Internet address where the captured audio is stored.

U.S. Pat. No. 8,429,287 to Sullivan for Network Audio Distribution System and Method, issued on Apr. 23, 2013. This patent includes disclosure of a system that implements the distribution and management of plural client terminals that access the directory packets and stored audio content presented in the U.S. Pat. No. 8,125,988.

U.S. Pat. No. 8,856,267 to Sullivan et al. for Network Audio Directory Server and Method, issued on Oct. 7, 2014. This patent includes disclosure of systems and methods for routing the directory packets and stored audio content presented in the U.S. Pat. No. 8,125,988.

U.S. Pat. No. 8,898,329 to Sullivan for Network Audio Distribution System and Method, issued on Nov. 25, 2014. This patent includes disclosure of methods for routing the directory packets in the form of directory streams to various groupings of user client terminals, and a structured architecture for doing so, for the directory packets and stored audio content presented in the U.S. Pat. No. 8,125,988.

U.S. Pat. No. 9,020,469 to Sullivan for Network Audio Distribution System and Method, issued on Apr. 28, 2015. This patent includes disclosure of methods for selecting optimum content and optimum signal quality for the routing of directory packets and stored audio content presented in the U.S. Pat. No. 8,125,988.

U.S. Pat. No. 9,391,676 to Sullivan for Network Audio Distribution System and Method, issued on Jul. 12, 2016. This patent includes disclosure of further refinements and efficiencies for routing and distribution of the directory packets and stored audio content presented in the U.S. Pat. No. 8,125,988.

The foregoing body of technology and patent rights go a great way toward integrating traditional radio scanning receivers and equipment with Internet communications, and delivery of such communications to users having access to network connected client terminals. There are presently client terminal devices available that can selectively monitor radio broadcasts from public safety services, government agencies, and business radio services in a manner where the user of such terminals need have no direct access to, nor much knowledge about, scanning radio receivers. For many users, the desired service is the ability to listen to, or be aware of, radio traffic that contains information useful to them. An example of such useful information is the desire of breaking news services to monitor activity on police and fire radio communications systems. When a major event occurs, such as a building fire or a police chase, a news service can quickly dispatch a reporter or photographer to the event, which can them be promptly covered as a breaking news story. There are many other individuals and businesses that benefit from monitory such channels for useful information, as will be appreciated by those skilled in the art.

Another aspect of delivering such useful information is the fact that users and service providers are increasingly relying on Internet channels as a resource for communications, in addition to reception of radio channels. This concept somewhat blurs the line as to what channels need to be monitored for message that contain useful information. Even the foregoing technologies disclosed in the Inventors' Prior Patents transfer radio broadcast messages into Internet accessible files containing both audio content and digital information related thereto. Thus, client terminals may monitor Internet channels as well as radio channels. Some channels deliver stored content that is simply recalled from memory. The common denominator is that users seek to monitor channels that transmit messages that contain information useful to them.

A common feature in the foregoing teachings is the fact that most channel messages contain voice content that is to be monitored for useful information. Even though many agencies now employ digital communications, the fact remains that during rapidly evolving incidents and emergencies, users of public safety, government, and business radio services rely on voice communications due to its immediate familiarity, unlimited flexibility, and its ability to express urgency and emotions. Thus, most monitoring is that of voice content. Another basic reality of monitoring messages on channels over time is that the majority of the messages are routine communications that do not contain useful information to users of client terminals. This leads to a situation where uses must monitor a great volume of messages that do not contain useful information in order to hear the lesser fraction that do contain useful information. Thus, it can be appreciated that there is a need in the art for methods and systems that alleviate the aforementioned problems in the prior art.

SUMMARY OF THE INVENTION

The need in the art is addressed by the systems and methods of the present invention. The present disclosure teaches a method of monitoring communications channels and automatically providing selective notifications through a network that messages containing useful information, transmitted in the form of voice content, have been received. The method includes the steps of defining one or more keywords having an association with useful information, monitoring a channel according to a channel identity, which transmits periodic messages having voice content, by a network audio feed terminal, and transcribing voice content in a present message into textual data by a transcription processor. Then, comparing the textual data with the keywords by a comparison processor, and upon identifying a correlation therebetween, automatically generating a notification indicating receipt of the given message and the existence of the correlation with the keywords, and which includes the channel identity.

In a specific embodiment of the foregoing method, the notification includes a portion of the textual data, and the notification step further includes delivering the notification to a client terminal through the network, which displays a portion of the textual data. In another specific embodiment, the useful information is communicated through the channel by a public safety service, a government agency, or a business entity. In a refinement to this embodiment, the association keywords with the useful information is suggestive of activities presently being undertaken by the public safety service, the government agency, or the business entity using the channel.

In a specific embodiment of the foregoing method, the channel is a communications channel, such as a radio broadcast channel, a network communications channel, or previously recorded messages transmitted through a channel, which were recorded and are recalled from a memory. In another specific embodiment, the channel identity may include a radio frequency, a radio system identifier, a squelch control code, a radio system talk group identity, an Internet uniform resource locator, a network address, or a storage location.

In a specific embodiment of the foregoing method, the identifying a correlation step includes identifying a match between one of keywords and a portion of the textual data. In another specific embodiment, the identifying a correlation step includes locating a match between plural keywords and a contiguous portion of the textual data. In another specific embodiment, the identifying a correlation step includes locating plural matches between plural keywords and plural corresponding portions of the textual data.

In a specific embodiment of the foregoing method, the identifying a correlation step includes determining a likelihood of a match between one of the keywords and a non-identical portion of the textual data, and, the corresponding keywords are included in the notification. In a refinement to this embodiment, the method further includes sending the notification to a client terminal if the likelihood of a match exceeds a predetermined threshold. In another refinement, the method further includes generating a confidence factor indicating a numeric probability of the likelihood of the match, and including the confidence factor in the notification.

In a specific embodiment, the foregoing method includes the steps of transcribing voice content in a subsequent message into subsequent textual data by the transcription processor, and the identifying a correlation step further includes locating a match between a first keyword and a portion of the textual data, and locating a second match between a second keyword and the subsequent textual data.

In a specific embodiment, the foregoing method includes, storing the voice content of the present message, a time of transmission, and the identity of the channel at a network address, and the generating a notification step further includes sending the network address to a client terminal. In a refinement to this embodiment, the method includes recalling, by the client terminal, the voice content of the present message according to the network address, and reproducing the voice content. In a further refinement, the method includes automatically launching a message player upon receipt of the notification by the client terminal, to thereby accomplish the reproducing the voice content step. In another refinement, where the network audio feed terminal continues receiving subsequent messages from the channel, the method further includes automatically receiving and reproducing voice content of the subsequent messages by the client terminal. In yet another refinement, where the network audio feed terminal continues receiving subsequent messages from the channel, the method further includes reproducing subsequent voice content by the client terminal if the subsequent messages include corresponding subsequent notifications that indicate a match with at least one of the keywords. And in yet another refinement, where the network audio feed terminal continues receiving subsequent messages from the channel, the method further includes reproducing subsequent voice content by the client terminal, and adjusting a playback volume of the reproduced audio content for subsequent messages that include corresponding subsequent notifications that indicate a match with at least one of the keywords.

In a specific embodiment, the foregoing method further includes sending the notification to a client terminal. In a refinement to this embodiment, the notification includes the channel identity, including a radio frequency, a radio system identifier, a squelch control code, a radio system talk group identity, a network address, a network storage location or a uniform resource locator. In another refinement to this embodiment, the notification step is accomplished using a network push notification selected from an SMS text message, an email message, a social media chat message, or a wireless device application program transfer message.

In a specific embodiment of the foregoing method, the transcribing voice content into textual data step further includes transcribing voice content over plural messages, and the comparing the textual data with keywords step further includes comparing the textual data from the plural messages by the comparison processor, and the identifying a correlation step further includes identifying a correlation between the keywords and textual data derived from more than one of the plural messages.

In a specific embodiment, the foregoing method includes measuring a duration of the voice content in the present message, and the generating a notification step is performed only if the duration exceeds a predetermined minimum duration. In a refinement to this embodiment, the method further includes adjusting the predetermined minimum duration to control the quantity of messages compared by the comparison processor.

In a specific embodiment of the foregoing method, the channel is associated with an additional channel carrying additional messages, which may also contain useful information transmitted as voice content, and the method further includes providing within the notification, an identity of the additional channel. In another specific embodiment, the method further includes defining one or more negative keywords associated with non-useful information, and comparing the textual data with the negative keywords, and also blocking the generating a notification step upon identification of the negative keyword match.

An illustrative embodiment of the present disclosure teaches a system for monitoring communications channels and automatically providing selective notifications through a network that messages containing useful information, transmitted in the form of voice content, have been received. In this embodiment, the system includes a network audio feed terminal that monitors a channel with a channel identity, wherein the channel transmits periodic messages, and wherein the network audio feed terminal stores voice content from a given messages in an audio file at a network address, and then generates a directory packet that includes the channel identity, the network address, and the time of capture of the audio file. In other embodiments, the network audio feed terminal provides the function of capturing the voice content received from the channel and communicating it to a transcription processor. This communication could occur using the aforementioned file storage technique, or it could be communicated in real time or in near real time, subject to network latency, as will be appreciated by those skilled in the art. In this illustrative embodiment, the transcription processor is connected to the network and receives the directory packet, and in response to that, recalls the audio file from the network address and transcribes the voice content into textual data. A comparison processor connected to the network receives the textual data, and compares it with one or more keywords that are associated with useful information, and upon identifying a correlation therebetween, automatically generates a notification that indicates receipt of the given message and the existence of the correlation with the keywords, and also includes the channel identity.

In a specific embodiment, the foregoing system further includes a client server connected to the network that receives the notification, and the notification further includes a portion of the textual data, and the client server delivers the notification to a client terminal through the network, and the client terminal displays a portion of the textual data.

In a specific embodiment of the foregoing system, the useful information is communicated through the channel by a public safety service, a government agency, or a business entity. In a refinement to this embodiment the correlation of the keywords with the useful information is suggestive of activities presently being undertaken by the public safety service, the government agency, or the business entity using the channel.

In a specific embodiment of the foregoing system, the channel is a communications channel of the type selected from; a radio broadcast channel, a network communications channel, or previously recorded messages transmitted through a channel that were recorded and are recalled from a memory. In another specific embodiment, the channel identity includes at least one of; a radio frequency, a radio system identifier, a squelch control code, a radio system talk group identity, an Internet uniform resource locator, a network address, or a storage location.

In a specific embodiment of the foregoing system, the correlation is identified as a match between one of the keywords and a portion of the textual data. In another specific embodiment, the correlation is identified as a match between a plurality of the keywords and a contiguous portion of the textual data. In another specific embodiment, the correlation is identified as plural matches between a plurality of the keywords and a plurality of corresponding portions of the textual data.

In a specific embodiment of the foregoing system, the correlation is identified as a likelihood of a match between one of the keywords and a non-identical portion of the textual data, and the one of the keywords is included in the notification. In a refinement to this embodiment, the notification is sent through the network to a client terminal if the likelihood of a match exceeds a predetermined threshold. In another refinement to this embodiment, the comparison processor generates a confidence factor indicating a numeric probability of the likelihood of the match, and the confidence factor is included in the notification.

In a specific embodiment of the foregoing system, the transcription processor transcribes voice content in a subsequent message into subsequent textual data, and the correlation is identified as a match between a first keyword and a portion of the textual data, and a second match between a second keyword and the subsequent textual data.

In a specific embodiment of the foregoing system, the voice content of the present message, a time of transmission, and the channel identity are stored at a network address by the network audio feed terminal, and the notification includes the network address, and is sent through the network to a client terminal. In a refinement to this embodiment, the client terminal recalls the voice content of the present message according to the network address, and reproduces the voice content. In another refinement to this embodiment, the client terminal automatically launches a message player upon receipt of the notification to reproduce the voice content. In another refinement to this embodiment, the network audio feed terminal continues to receive subsequent messages from the channel, and the client terminal automatically receives and reproduces voice content of the subsequent messages. In another refinement to this embodiment, the network audio feed terminal continues to receive subsequent messages from the channel, and the client terminal reproduces subsequent voice content if the subsequent messages include corresponding subsequent notifications that indicate a match with at least one of the keywords. And, in yet another refinement, the network audio feed terminal continues to receive subsequent messages from the channel, and the client terminal reproduces subsequent voice content, and the client terminal adjusts a playback volume of the reproduced audio content for subsequent messages that include corresponding subsequent notifications that indicate a match with at least one of the keywords.

In a specific embodiment of the foregoing system, the notification is sent through the network to a client terminal. In a refinement to this embodiment, the notification includes the channel identity, which includes at least one of a radio frequency, a radio system identifier, a squelch control code, a radio system talk group identity, a network address, a network storage location, and a uniform resource location. In another refinement to this embodiment, the notification is sent as a network push notification selected from an SMS text message, an email message, a social media chat message, and a wireless device application program transfer message.

In a specific embodiment of the foregoing system, the transcription processor transcribes voice content over plural messages, and the comparison processor compares the textual data from the plural messages with the keywords, and identifies a correlation between the keywords and textual data derived from more than one of the plural messages.

In a specific embodiment of the foregoing system, the network audio feed terminal measures a duration of the voice content in the present message, and the notification is generated only if the duration exceeds a predetermined minimum duration. In a refinement to this embodiment, the comparison processor adjusts the predetermined minimum duration to control a quantity of messages compared with the keywords.

In a specific embodiment of the foregoing system, the channel is associated with an additional channel that carries additional messages, which may also contain useful information transmitted as voice content, and the notification includes an identity of the additional channel. In another specific embodiment, the keywords further include one or more negative keywords associated with non-useful information, and the comparison processor compares the textual data with the negative keywords, and blocks the generation of the notification upon identification of a negative keyword match.

DESCRIPTION OF THE INVENTION

Figure 1:
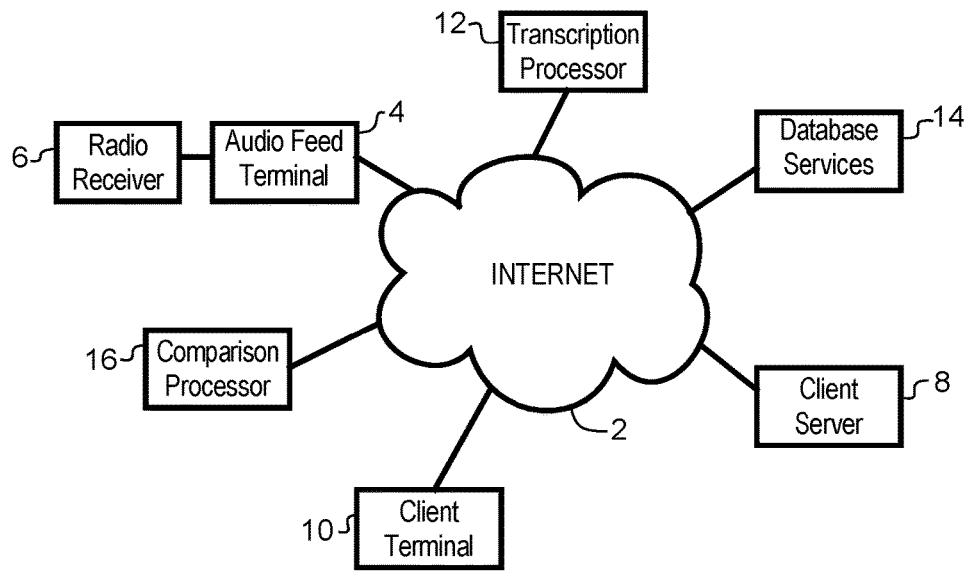
FIG. 1 is a system diagram according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

Following on the Inventors' Prior Patents, as discussed in the Background section of this paper, additional useful and novel disclosures are herein presented. An illustrative embodiment system wherein public safety services, government entities, and business radio broadcasts are fed either over the air or via network, which are processed with a voice to text transcription processor, is presented. A single keyword, plural keywords, or phrases (collectively, 'keywords') are stored in a file and certain message transmissions are transcribed from voice to text, and compared against selected keywords. If there is a match then a notification of the message is presented to a user via one or more methods including email, text, chat, web page, phone or tablet application program ('APP'). The notification may or may not include a link to the transmission, and such a link enables the user to listen to the message using a client terminal. The message may also play automatically upon receipt of the notification by a client terminal. When there is a keyword match, for example "fire" or "report of a fire", on a specific radio talkgroup or frequency, then the user is notified and may monitor all follow-up transmissions on that same frequency, and also possible additional frequencies or talkgroups associated with that channel. For example many public safety departments have a dispatch or tone alert/paging channel to announce a fire call and then separate tactical or fireground channels that are used while responding to the call, or for on-scene communications at the incident. It is useful for the user to know, after a keyword is reported on a dispatch channel, that the user might access additional related tactical, fireground, mutual aid, intercity fire, or similar channels associated with the original channel as well. The notification can be presented in a variety of ways including a transcription of each transmission on all associated radio channels, a link to an audio file stored on the network (e.g. the Internet) to play the transcribed transmission as well as a live player to listen to the live, or previously stored, messages on the associated channels as well. The channel association may be made automatically based on previously known channels, such as related city or agency names for example, or by user selection.

The message transmissions in the prior illustrative embodiments could be received live or could be recalled from previously recorded and stored messages. High performance Internet cloud storage services are available and are useful for this purpose, and are cost effective as well. In another embodiment, the transcribed textual information is used to automatically make channel selections based on certain criteria within the text, for example a fire department that places its dispatch messages in text form on its public web page. In another embodiment, a "heat signature" could be used. That is, if a channel is showing a higher frequency of transmissions than its normal level, then the messages are transcribed and presented whether or not a keyword is present, and then all of the follow-on techniques can be used to provide access to the transcriptions, transmissions, or a live player from a single channel or group of channels associated with the initial channel. A heat signature may also be based on a grouping of agencies, such as the police and fire department in one city, or all the fire departments in a region or county.

The foregoing channel notification embodiments can be taken a step further by applying them to a scanning radio receiver ("scanner") in and of itself. The scanner is connected to a personal computer either directly or over a network (or, the scanner itself may comprise sufficient processing power to operate as a stand-alone unit), where the scanner monitors transmissions for keywords and then reproduces, and perhaps records, all follow-on transmissions from that channel or a related group of channels, as discussed above. In another illustrative embodiment, and due to the fact that there is so much radio traffic that does not contain useful information, a scanner can conduct the keyword matching process internally and then reproduce the voice content of messages only if a keyword match is found.

In another illustrative embodiment, a structured approach is employed, as follows. A radio receiver records an over-the-air transmission, and sends the recording to a server, such as the Amazon Simple Storage Service (S3) data service (https://aws.amazon.com/s3/), and also notifies a client server in the network by sending a directory packet according to the teachings in the Inventors' Prior Patents. Notification of the transmission is also sent to a text transcription service, which may include the audio file itself or a URL of the stored audio file location. The transcription service returns a transcription of the audio file, and that text is scanned against keywords, and upon identifying a match, sends notification via SMS or similar push service. The transcribed text is sent into existing system servers for distribution according to the teachings of the Inventors' Prior Patents, and may appear in a user's player after audio has already started playing. This is due, in part, to the delay in the transcription process where the initial directory packet arrives before the notification, which does not occur until after the transcription has been completed. In one embodiment, the push notification includes a link to a client terminal player application, which may be in the form of a URL that includes the identity of the channel receiving the event detection information, and can also list related channels for possible monitoring. When the link to the player is selected, it launches with just those channel(s) active, starting at the time of the translated text. The set of channels to be played may include; (a) the detected channel, (b) the entire group of related channels received from the Radio Reference database (www.radioreference.com), which includes fire dept tactical channels related to a dispatch channel, or (c) custom set of channels designated by the user. The client terminal player may also give the user an option to select all three sets of channels for reproduction in the player.

In another embodiment, a predetermined minimum duration of a transmission is used as a test to trigger text transcription, because longer communications transmissions are usually more descriptive, and, this limitation on transcription can save transcription costs. The illustrative embodiment also uses patterns in subsequent communications to help detect whether a transmission is of sufficient interest to warrant a push a notification or transcription.

Reference is directed to FIG. 1, which is a system diagram according to an illustrative embodiment of the present invention. In this embodiment, the Internet 2 provides the network functionality. A radio receiver 6 receives radio broadcasts from various public safety services, government agencies, and business radio users (not shown). The radio receiver 6 is typically a scanning radio receiver, although fixed frequency radios can certainly be employed. The radio receiver 6 is coupled to a network audio feed terminal 4, which is a network terminal and processor enabled to capture voice content and data from the receiver 6, including content in the received broadcast messages. The network audio feed terminal 4 is operable to further process and couple this information, as well as derivative information, into the network 2 according the network protocols and network addressing. The network audio feed terminal 4 may be one of plural network audio feed terminal (only one shown), which build a regional network of radio monitoring stations. The network audio feed terminal 4 communicates through the network 2 with several other network terminals and processes, including a client server 8, a transcription processor 12, a comparison processor 16, a client terminal 10, as well as various database service 14. Note that while this diagram illustrates just one of each of these network elements, there may be, and in fact usually will be, a plurality of these elements provided to distribute processing, storage, and communications, as well as to enable scaling of services from local to regional to national scale.

The network audio feed terminal (hereinafter "feed terminal") receives messages from the radio 6 as they are received in real time. The feed terminal 4 samples the voice content in such messages, and writes an audio file, which is a digitized copy of the voice content, to at a network address located in one of the database services 14. Thus, for each message received by the radio 6, there is corresponding audio file located at an IP address, or uniform resource locator ("URL"), which is accessible by other network elements. In addition, the feed source 4 generates a directory packet for each message received. The directly packet includes, among other information, the channel identity of the channel that carried the message, the time the broadcast was captured, and the URL of the stored audio file. The directory packet does not contain the audio file itself. These directory packets are communicated through the network 2 to the client server 8.

The client server 8 in FIG. 1 is analogous to the directory server disclosed in the Inventors' Prior Patents. Keywords are stored in a file, a data structure, or a database, and represent words that are indicative of useful information. Using processes that will be more fully discussed hereafter, the transcription processor 12 receives the audio files and transcribes them into textual data, which are then communicated to the comparison processor for comparison with selected keywords. Note that the system keeps tract of what channel is involved with each message using the aforementioned directory packets. Also note that the selected keywords are linked with particular users of client terminals 10 so that keywords indicative of useful information for each user are applied in the comparison process to identify messages on channels carrying information useful to that user.

The various functional blocks in FIG. 1 represent certain functions. It will be appreciated by those skilled in network architecture design, that these functions can be physically separated or consolidated in various ways. For example, the client server 8, transcription processor 14, and comparison processor 16 could all run on one physical device. Or, the transcription processing could be communicated to a commercial transcription service, such as the IBM Watson Speech-To-Text service, which can be accessed at: (www.ibm.com/watson/developercloud/speech-to-text.html). The transcription processor can also be a proprietary software module developed to suite the illustrative embodiment systems and methods.

The client terminal 10 in FIG. 1 is the user interface for an end user of the services contemplated under the present teachings. Typically, this will be a personal computer, smartphone, or other personal computing device, which includes a processor, a display, a user input mechanism (e.g. keyboard), an audio interface (e.g. loudspeaker), and a network communications interface. In operation, the client terminal 10 may reproduce audio files so that the user can listen to monitored message, and may also present a visual display of the channel being received, the transcribed textual information, and other operating information, controls, and selectors.

Figure 2:
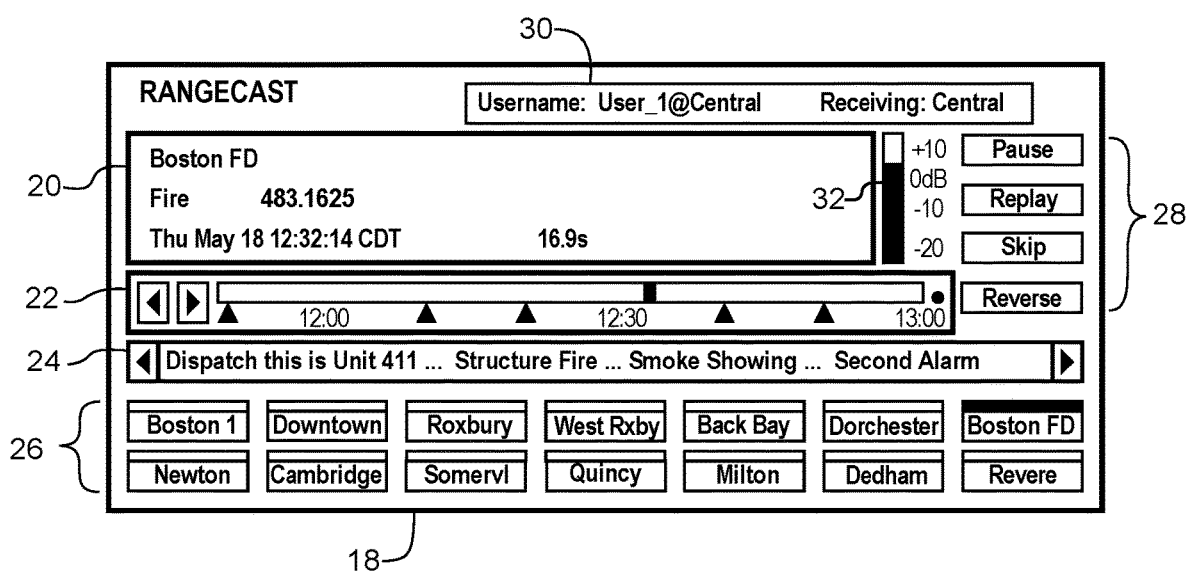
FIG. 2 is a client terminal display drawing according to an illustrative embodiment of the present invention.

Reference is directed to FIG. 2, which is a client terminal display 18 drawing according to an illustrative embodiment of the present invention. As noted above, the client terminal also includes an audio interface, a network interface, and certain processing capabilities. An exemplary display 18 is presented in FIG. 2. This display 18 is similar to the user interfaces discussed in the Inventors' Prior Patents as well, with the notable addition of the transcribed textual information display area 24. The display 18 includes a user and service section 30 showing the user's username and service of reception, in this example "user_1@central", who is accessing the "Central" monitoring service. A reception display area 20 shows the agency using a radio channel, which in this example is the Boston Fire Department, who is broadcasting on the radio frequency of 483.1625 MHz. The reception display also shows the date and time of the transmission, which is Thursday May 18 at 12:32:14 Central Daylight Time, and the duration of the message currently being reproduced, which is 16.9 seconds in this example. Note that the client terminal is not a radio receiver, but rather a network terminal that is receiving and presenting information through a network, and that the original reception and capture was performed by a network audio feed terminal for distribution to plural client terminals.

The client terminal display 18 in FIG. 2 further presents a bar-type voltage unit ("VU") meter 32 that indicates the received signal strength provided by the network audio feed terminal (not shown). Since the client terminal is reproducing content received through the network, reproduction can occur in near real time or in a playback mode. Therefore, the user is presented with transport controls 28, including Pause, Replay, Skip, and Reverse. These controls 28 enable the user to navigate messages as desired. In addition, a time slider control 22 is provided, which allows the user to move forward and backward in time to replay messages of interest, view the time at which messages were captured, and advance the playback to the near real time position, as desired. In the lower portion of the display 18, the user is presented with a plurality of predetermined channels of interest, which includes the current channel "Boston FD", and other options, as presented, e.g. "Roxbury", "Milton", "Newton", and so forth. These are the channels of interest for this user, and each may be monitored, or groups of them may be "scanned" for messages containing useful information.

A notable feature of the illustrative embodiments client terminal display 18 in FIG. 2 is the textual data display area 24. As discussed hereinbefore, the transcription processor (not shown) transcribes voice content into textual data. The textual data can be forward to the client terminal in a directory packet or by other communications techniques. The textual data is then displayed in the textual data display area 24 of the display 18, either coincidentally with the reproduction of the audio, or independently thereof. Note that the textual data display 24 includes forward and backward slider controls, as illustrated. The textual data display area 24 enables the user to view the transcribed text as a means of determining the content of a given message. In addition, the keywords used by the comparison process in identifying a match can also be displayed, as well as a confidence factor indicating the likelihood of a match. This feature of the present disclosure will be more fully discussed hereinafter.

Figure 3:
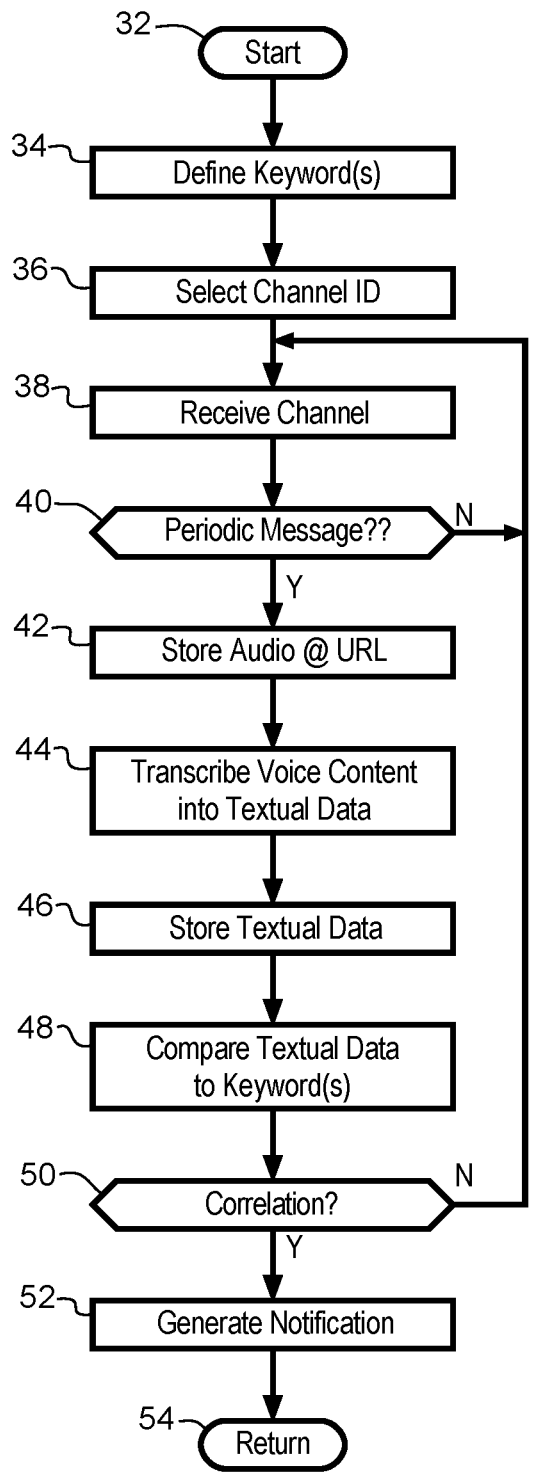
FIG. 3 is a process flow diagram of channel monitoring and notification generation according to an illustrative embodiment of the present invention.

Reference is directed to FIG. 3, which is a process flow diagram of channel monitoring and notification generation according to an illustrative embodiment of the present invention. This illustrative embodiment is a basic implementation of the teachings of the present disclosure. A wide variety of modifications are possible, as will be more fully discussed hereinafter. The basic process starts at step 32 and proceeds to step 34 where the keywords are defined. At step 36, a channel identity, or a group of channel identities, is selected for monitoring. At step 38, the channel(s) is received by a network audio feed terminal and the channel is monitored. Step 40 is a recurring test that looks for a periodic message transmitted through the selected channel. When a periodic message is received, the process continues to step 42. At step 42, the network audio feed terminal samples the voice content in the received message and stores a digital copy of the voice content at a network address, which is accessible using a uniform resource locator in an Internet protocol network. At step 44, the transcription processor receives a copy of the digitized voice content and the defined keywords, and transcribes the voice content into textual data. At step 46, the textual data is stored in a file, data structure, or database. This action may be accomplished by the transcription processor, the network audio feed terminal, or the client server, depending on the network arrangement and other design considerations, as will be appreciated by those skilled in the art.

Having transcribed the voice content into textual data at step 44 and 46, the comparison processor compares the textual data with selected keywords at step 48, and determines whether a correlation exists at step 50. If no correlation is found, monitoring for another message continues at step 38. If a correlation is found at step 50, a notification is generated at step 52. The notification indicates receipt of the given message, and indicates there was a correlation with the keywords, and includes the channel identification, and may include the network address of the stored audio file, among other information. The process of FIG. 3 returns at step 54.

With respect to transcription, the present disclosure contemplates various ways that text transcription may be used in a client terminal running a message player application program (also referred to as a "player"). In a "Monitor Mode", when the quantity of traffic exceeds one Erlang (when it becomes impossible to play all transmissions without falling more than a predetermined amount of time into the past), transmissions are selectively played or discarded so as to keep pace with the real-time clock. Factors used to rank eligible transmissions include the priority level of a channel and the duration of the transmission, with longer transmissions being favored. With text transcription, keywords may be used as indicators to raise, or possibly lower, the score of a transmission. In this context, keyword matching may be applied to the individual transmission, or to surrounding transmissions on the same channel, and even related channels, (e.g. in the same public safety service department), for a limited period, so as to catch other traffic related to the event indicated by the keyword match.

The client terminal message player application provides a means for selecting channels of interest, and reviewing the history of past transmissions on these channels. There is an option for filtering the playback of past transmissions by a minimum transmission duration threshold, so as to trim out transmissions of less interest, such as shorter transmissions. When combined with a keyword search, playback can be filtered to only those transmissions matching keywords of interest, or a series of transmissions proximate to a transmission with a matching keyword. With both "monitoring mode", which is near real-time, and "history mode", which is archival review of past transmissions, selected transmissions may be rendered to the user as text and/or audio, as opposed to just audio. Text representation can be scanned more quickly by eye, to identify content of particular interest. This may be accomplished by an end user himself, or the user may click on a displayed translated transmission to activate audio playback of that transmission, or that channel from that time forward, or a group of related channels from that time. Note that audio playback triggered in this manner may set both the time and set active channels, in accordance with the time/channel of the manually selected transmission.

The present disclosure also contemplates the concept of text notification outside the player, as a push notification, (e.g. text message or e-mail), that carries a link activating a client terminal message player application, which renders content on channels/time based on the channel/time of the indicated transmission. Channels may currently be placed into a priority state, where new content on a priority channel is played ahead of other content, even content recorded at an earlier time and awaiting playback. With text transcription, a "priority" status may be applied to either transmissions or channels based on keyword matching in a new transmission. Similarly, channels in a "test text matching, but do not play as audio" state can be elevated to a "play as audio" state, in response to keyword matching. In this scenario, channels are not played unless content on a channel matches a keyword, activating playback on the channel. In addition to playback with yes/no filtering by keyword, channels can also have their volume adjusted by keyword matching. Also note that keyword matching is not restricted to a single transmission, but also a combination of transmissions. For example, a keyword in one transmission followed by a second keyword broadcast within a predetermined time period, perhaps five minutes, could establish trigger criteria.

In an illustrative embodiment, when a new transmission is reported to a client server, which includes a URL where an audio file is stored, a similar notification is sent to a transcription processor. A short time later, that processor sends a notification to the client server, identifying the file ID, and providing the text transcription. The client server adds that metadata to a transmission history database, and pushes out a notification to connected client terminals, in the same way as would be done for reporting a new transmission on the same channel. The player receives text notifications, either via that push, or by database pull when reviewing past events. When transmissions with text are in queue to be played (or have recently been played), the text is shown alongside the description of the transmission, including time, channel, duration, etc., in a display panel of the client terminal with a scrolling list of queued/played transmissions.

Some of the core concepts of the present teaching may be applied in flexible manners. For example, "keyword matching" can mean matching the presence of one or more keywords in a single transmission, or in a series of transmissions on related channels within a short time period. In response to a keyword match, the client terminal may change the selection priority of the transmission(s) or channel(s) containing the match, or a group of related channels. "Selection priority" may imply a yes/no decision for displaying text, activating audio playback, jumping a time-ordered queue when sequencing playback, or a numerical score that feeds into a comparative selection engine. For example, the aforementioned "monitoring mode's" one Erlang capacity limit, which cuts off playback at a predetermined score threshold.

With respect to keyword specification, storage and selection, in one embodiment, the client terminal message player application is used to search the textual data for keywords, and keywords are used automatically as a factor when there is a need to filter content. For this usage, sets of keywords for specific applications are predefined by the service provider, and are available to all users. Or, the users may enter custom keywords. In any case, these are used only in the client terminal and there is no notification to the client server. In another embodiment, keyword sets are predefined or custom. When the client server receives a report of a new text transcription, it consults a list of users subscribed for notifications from that system, determines whether specified keywords (part of that client's subscription info) are matched, and if so, sends a notification.

It should be noted that some users of the services presented in the present teachings are more concerned with receiving notifications about useful information transmissions than they are concerned about over-notifications, or false alarms. What these users desire most is to be interrupted and directed to the specific, such as "this may be something useful" audio, which they finally evaluate by listening for themselves. Therefore, it is useful to employ a list of phrases of interest, including words adjacent, words separated by a comparatively short time period (e.g. under $1/10$ second), and generate a list of word pairs of interest, such as words proximate that are separated by up to ½ second. When $1/10$ second is used as a threshold, the word is prefixed with a plus symbol, (e.g. "+water"). So the resultant list may look like:

$1/10$ Second Threshold Satisfied
    working+fire
    first+alarm
    second+alarm
    business+is+on+fire
Greater Than $1/10$ and up to ½ Second Threshold
    water damage
    smoke damage
    water apartment
    smoke apartment
    water house
    smoke house A data tree structure is developed, filing each of these phrases/pairs under a bucket labeled with the first word. When a word in the transcription is encountered, a copy of the word is placed in a bucket, which is labeled with that word, to a second data structure that holds stuff that has started to match somewhere in the audio, recording the end time of the word that matched. With the same word, the system goes through the second data structure, to determine whether this word is a first remaining word for any of the "started to match" items, where the gap between the recorded end time and new word start time is acceptably short. If so, (a) if that completes a sequence a keyword correlation is declared, (b) if there are longer sequences the items are promoted in that bucket so the system is ready to detect the next word in the chain. This is similar to drawing every possible word inside its own circle, and drawing lines between words if they are spoken closely together, and determining whether any of the phrases of interest can be made by tracing out lines through each word somewhere on the map. Phrases are marked as meaning things like "of interest to restoration" and "possible medical call", so at the end, a rule can be applied, such as "if yes to 'of interest to restoration' and 'no to possible medical call' then send an alert."

Under the teachings of the present disclosure, the conversion of voice content into textual information is referred to as transcribing or a transcription. This terminology is generally consistent with the common definition in that spoken words are converted into text using transliteration between the sequence of phonemes within a message's voice content and textual data output by the transcription processor (e.g. English language words). As with any transcription, such as between two languages, the correspondence between phonemes and words/letters is imperfect and requires a calculus of reason to accomplish the task at hand. This leads to the concept of a confidence factor in estimating the likelihood that the transcription was accurate with respect to the meaning intended by the individual that originally uttered the voice content. It also raises the issue of selecting one, among plural, elements of textual data that correspond to a given sequence of phonemes in the voice content. That is to say, a transcription processor may return plural alternative sets of textual data for a given section of voice content. Ultimately, a 'section' of voice content is defined by its start and end times, or start time and duration, within a message's voice content. This complicating factor indicates that the determination of a correspondence between plural alternative elements of textual data returned from the transcription processor and a predetermined set of keywords (individually, selectively, or as phrases) is likewise dependent upon a calculus of reason.

Now, considering further the aforementioned transcription process using a tree structure analysis. In that context, "transcription" does not simply mean the best-match word-by-word transcription of the voice content, which might be picked up and read aloud to reproduce the original voice content, excepting the probability of transcription errors. Instead, what the transcription processor produces as it traverses the voice content is a list of "word alternatives". For example, the voice content might comprise the phrase "the dog is in the house" and the list of word alternatives returned from the transcription processor might include: (the), (dog OR bog OR hog), (is in the), (house OR mouse), where each word is associated with start/stop times, and a confidence value. Thus, the times for "house" and "mouse" would overlap, as they're alternative transcriptions for at least some of the same spoken phonemes in the voice content, and so forth. Thusly, it is reasonable to include the "word alternatives" report under the broad label of "transcription", as each word is the result of transcribing spoken sequence of phonemes transcribed from voice to text. In the process of traversing this whole-message voice content rendering to encounter words, alternatives like "hog" and "mouse" would be overlooked. It has been determined that looking at the word alternative list, instead of the whole message transcription, is incredibly powerful and a key concept for making this system practical to implement. Addressing the probabilities and calculus of reason issues presents substantial opportunities to optimize system performance, thusly increasing transcription accuracy, reducing the number of false alert notifications, and/or reducing the number of missed alert notifications (false negatives).

Figure 4:
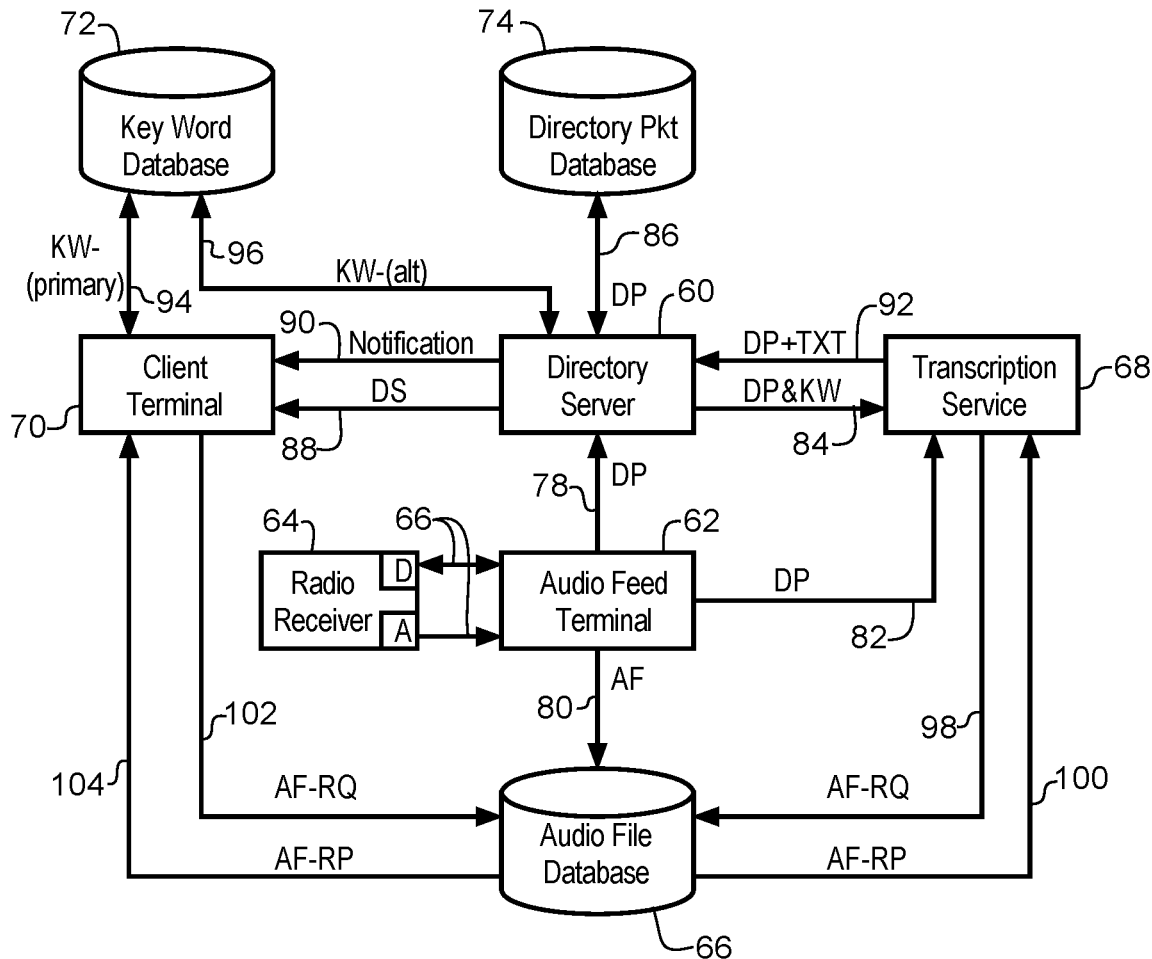
FIG. 4 is a functional block diagram according to an illustrative embodiment of the present invention.

Reference is directed to FIG. 4, which is a functional block diagram according to an illustrative embodiment of the present invention. This diagram present an embodiment showing communications amongst elements of the system from radio reception of a message containing useful information through to delivery and presentation of such a message in a client terminal, along with textual information. A radio receiver 64, such as a scanning radio receiver, is coupled 66 to an audio feed source 62, which is a network terminal device such as a personal computer with Internet access. Messages received by the radio 64 are transferred 66 to the audio feed source 62, and includes both voice content and certain data from the radio. This data varies with the type of radio, but may include the frequency of operation, a description of the radio channel users or service, such as Boston Fire Department, and other channel identifying information, as well as radio reception parameters. The reader is directed to the Inventors' Prior Patents for further details. Also note that the audio feed source 62 may control operation of the radio through the data portion of the connection 66. When a message is received, the audio feed source 62 samples the voice content and converts it to a digital audio file. The audio feed source 62 further generates a directory packet, which includes the channel identity, the time of capture, and the URL at which the audio file is stored, among other information. The audio file is coupled 80 to an audio file database 66, which may be an Internet data service, such as Amazon Simple Storage Service (S3) data service (https://aws.amazon.com/s3/). The directory packet is coupled 78 to a directory server 60, which is another network-connected device. The directory packet may also be forwarded to a transcription service 68, such as the aforementioned IBM Watson service. In this manner, the transcription service is aware of the message, and has the URL for the audio file within the directory packet, so that it may access the voice content in the form of a digital audio file.

In certain embodiments of the transcription service 68 in FIG. 4, the transcription service may be capable of determining the likelihood that particular keywords are found in the textual data transcribed from the voice content. This is an available feature on the IBM Watson service. Thus, it is necessary to provide the keywords of interest to the transcription service at the time transcription is requested. For this to occur, as illustrated in FIG. 4, the directory server 60 recalls the keywords of interest 96 from a keyword database 72 for a particular directory packet. Then, the directory packet and the keywords are sent 84 to the transcription service 68. The transcription service 68 requests the audio file 98 according to the URL in the directory packet, which is returned 100 from the audio file database 66 to the transcriptions service 68. The transcription service 68 can then return 92 the directory packet together with the transcribed textual data and a list of keywords that are likely to have been found in the textual data. Each of the likely matches includes a confidence factor that is a numeric probability of a match. For example, the textual data may read "working on a tire", and the transcription service might return "working on a fire" with a 0.65 confidence factor (65% likely match).

In other embodiments, where the transcription service 68 provides a list of alternative textual data words with corresponding probabilities of a match, then the transcription service 68 need not be provided the list of keywords, as the keyword comparison would be conducted by another network element, such as the directory server 60, client terminal 70, or other network element. For example, the aforementioned IBM Watson transcription service can provide transcription in either mode. It can be fed keywords with the voice content and provide textual data with corresponding probabilities of a match, or, it can provide a range of likely matches to self-generated words, so called "word alternatives" based on interpretation of phonemes, also with a corresponding probability of a match. Another aspect of determining the probabilities and confidence of accuracy in the transcription process is the use of compounding factors. The transcription processor may produce the confidence for a phrase by multiplying together the confidence of each elemental word in the phrase. For example, if there is a 50% chance of "water" and 80% chance of "damage" in the word alternatives report, then if "water damage" was listed as a keyword at transcribe time, which would suggest a probability of 40% of that phrase. As a result, by storing the word alternatives report for a transmission, it is possible to later detect and generate a confidence score for any phrase after the transcription has occurred. And this analysis can be conducted by any network element, including the client terminal.

Continuing in FIG. 4, the directory server 60 maintains an array of information about various terminals in its service network. These include a plurality of audio feed sources (only one shown 62), a plurality of client terminals (only one shown 70), and various data and configuration parameters for operation. Again, refer to the Inventors' Prior Patents for further information on directory server operation. One function that the directory server 60 implements is the production of directory streams, labeled "DS" in FIG. 4. A directory stream is a compilation of directory packets for a given terminal over time, and each directory stream is filled with directory packets according to the needs of each terminal receiving a directory stream. In routine operation, a directory stream 88 is sent to the client terminal 70 as messages are received by the audio feed source 62. Note that not all messages are transcribed, and that directory stream function is fully described in the Inventors' Prior Patents. In FIG. 4, the directory server 60 sends individual directory packets 84, or a directory stream, to the transcription service 68. These are directory packets identifying messages that require transcription. The transcription service 68 acts on the directory packets in the directory stream 84 by requesting the corresponding audio files 98 from the audio file database 66, which promptly returns the requested audio file 100 to the transcription service 68. Alternatively, the audio feed source may send directory packets 82 directly to the transcription service 68, with the same audio file request and return process being invoked. In this illustrative embodiment the primary mode of operation is for the audio feed source 62 to send the directory packets 82 directly to the transcription service 68.

Continuing in FIG. 4, regardless of how the transcription service 68 received a directory packet 82, 84, the corresponding audio file is requested 98 and returned 100 from the audio file database 66. The transcription service 68 transcribes the voice content of the audio file into textual data, and may perform other operation, as will be further discussed hereinafter. The textual data is combined with the directory packet and sent 92 back to the directory server 60. Thus, the directory server 60 has all the information of the directory packet plus the textual data and other information that was added by the transcription service 68.

Having the textual data retuned from the transcription service 68 as well as the original directory packet, the directory server 60 is enabled to notify the client terminal 70 if there is a useful correspondence between the voice content textual data and the keywords of interest for the particular client terminal 70. This association is established by the content of a keyword list, file, data structure, or database 72, as illustrated in FIG. 4. While it is certainly feasible for each client terminal to enter a list of keywords associated with useful information, such as "fire", "alarms", "smoke" and so forth, it is preferable to predetermine keyword groupings that can be selected, so as to simplify the configuration process for typical users. This information can be organized by the data structure, indices, and organization of the keyword database 72. For example, groupings of keywords reasonably associated with a fire department communicating activities about an ongoing fire can be indexed together. Thusly, client terminals for users who deem working a fire as useful information to them can select this index and be notified when messages containing fire-related communications are being received.

Figure 5:
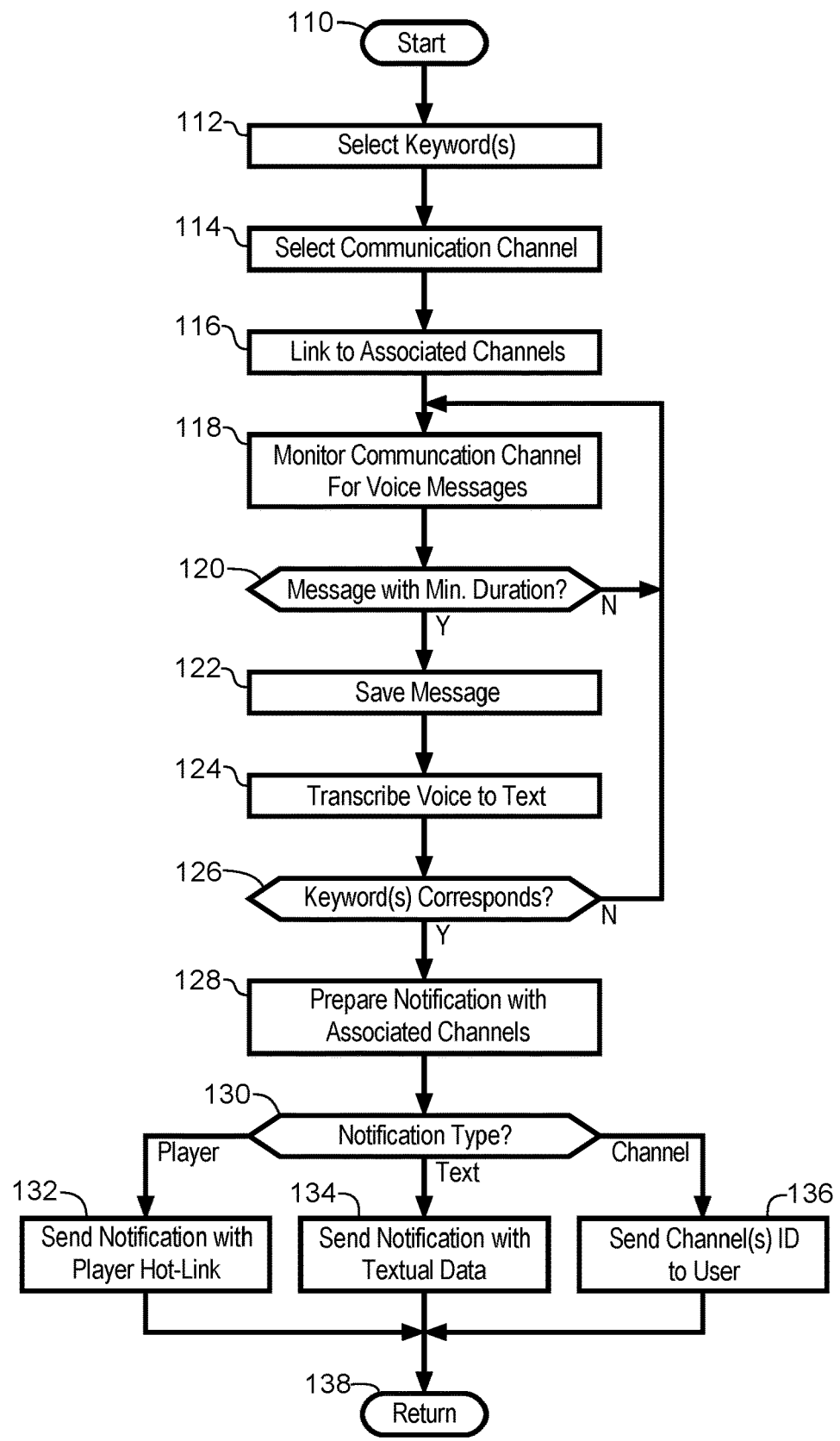
FIG. 5 is a process flow diagram of channel monitoring and client terminal notification according to an illustrative embodiment of the present invention.

Reference is directed to FIG. 5, which is a process flow diagram of channel monitoring and client terminal notification according to an illustrative embodiment of the present invention. This embodiment illustrates certain alternative approaches to the selection of messages for transcription as well as certain alternative for notifying users of client terminals that useful information may be present in messages communicated through channels. The process begins at step 110 and continues to step 112 where one or more keywords or phrases are selected. This selection could be a simple as manual entry of selected keywords of interest by a particular user, or the specification of an index to a data structure of predetermined keywords likely to be utilized in voice communications on a subject of useful information. At step 114, one or more communications channels of interest are selected. This selection can also occur in variety of ways. On a radio, the user could simply enter a radio frequency of interest. Or, as illustrated in FIG. 2, preprogrammed options in the radio could be selected. The channel could also be selected according to an Internet protocol address or URL. Again, refer to the Inventors' Prior Patents for further details on specifying and selecting communications channels.

Having selected one or more channels at step 114, there may be associated channels that are also of interest, by virtue of their related use in connection with the selected channels, which is noted at step 116. For example, the user may have selected a fire department dispatch channel for their local city. The system may be aware of tactical channels or fireground channels that are routinely used in connection with the dispatch channel, and which are routinely utilized when a fire is being worked by that fire department. These additional channels will be linked in as associated channels at step 116 so that the user of the client terminal has a higher probability of being notified of useful communications from that fire department. At step 118, the system begins monitoring messages on the selected channels. Messages are typically detected using a signal detector, squelch threshold, squelch control code, or other means know to those skilled in the art. The reader is again referred to the Inventors' Prior Patents for detailed teachings on channel message detection. The vast majority of messages are intermittent messages of brief duration, typically under one minute in duration. Although the teachings of the present disclosure can be readily applied to messages of any duration, including even continuous broadcast messages. Messages of intermittent nature are typically one in a series of a back and forth communications, such as between a dispatcher and emergency service personnel. Some messages are very short, such as in the scale of one second, and these usually do not contain references to useful information. Longer messages are more likely to contain useful information, such as a firefighter explaining the details of an evolving fire to his dispatcher, for example.

At step 120 in FIG. 5, the system tests whether a present message has a duration greater than a minimum duration threshold. This test prevents the system from transcribing a great volume of short messages, which probably do not contain useful information, as noted above. The elimination of short message transcription reduced system transcription load, and controls costs where a commercial transcription service is hired to attend to the transcription processing. If a present message fails the minimum duration test, the system returns to monitoring at step 118. If the duration is sufficiently long, the process continues to step 122, where the present message is digitally sampled, stored in the audio file database, and the directory packet is generated. At step 124, the voice content in the message is transcribed to textual data by the transcription processor.

With the present message transcribed at step 124, the process continues to step 126 where the textual data is compared with specified keywords by the comparison processor to determine if a correspondence exists that would suggest the message contains useful information to the user of a given client terminal. If not, the process returns to step 118 to continue monitoring for another message. If a correspondence is found at step 126, then the system prepares a notification at step 128 for communications to the user. This step 128 may also include the designation of associated channels in addition of the particular channel that carried the present message. At step 130, the system checks to determine what notification type is appropriate for the user and client terminal designated to receive a given notification.

Step 130 checks to determine what notification type has been specified for the user and client terminal designated to receive the present notification. In this embodiment, there are three alternatives, channel ID notification, delivery of the textual data to the user, and delivery of a hot-link to a player application, which loads and runs a channel receiving function upon receipt. If the user is designated to receive the channel ID only, then a notification which include identification of the channel by it channel ID, as well as associated channels if they exist, and sending the channel ID(s) to the user occurs at step 136. This notification could be sent using a wide variety of means. An SMS text message could be sent to a Smartphone, or an email message, or a push message to an application program, and many other means as are know to those skilled in the art. On receipt of the channel ID(s), the user is enabled to adjust his receiver or player to begin receiving the channel(s) according to the channel ID(s). If the user has designated text delivery of the notification, then the process goes to step 134 where the system send the notification, including the channel ID, the time of capture, the URL of the stored voice content, and a copy of the textual data. Having the textual data, the player or application program can present the textual data to the user for interpretation.

If the user has designated an embedded player notification at step 130 in FIG. 5, then the system sends a notification containing the channel ID, the time of capture, and URL of the voice content audio file, and a hypertext link to a web-served player. With this approach to notification, the user simply selects the hypertext link, which accesses the serving web page and runs a web served player. The web served player is loaded with the channel ID and time of capture, and immediately begins presenting the audio content at that point in time, and continues playing the audio content on that channel ID. Note that by the time the client terminal accesses the content, it has already occurred, so the player is running in a history mode, catching up to real time by compressing the quiet time between messages until the player catches up to real time. Again, see the Inventors' Prior Patents from further discussion of history mode playback of audio content. The client terminal type can be any Internet connected device with suitable user interface, including smartphones, tablets, laptop computers and desktop computers. Regardless of the notification type at steps 130 to 136, the process returns at step 138.

Figure 6:
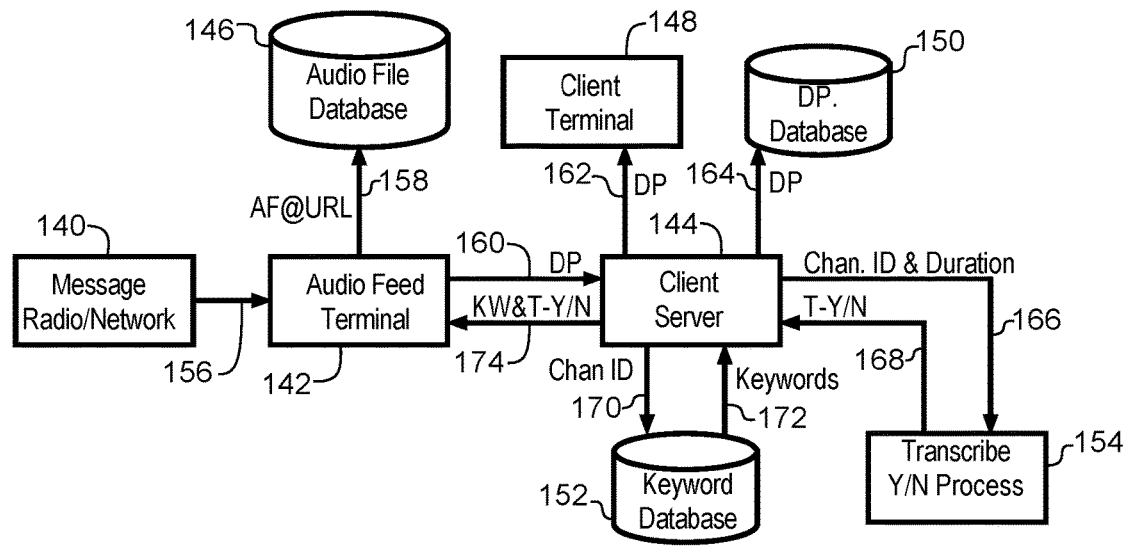
FIG. 6 is a functional block diagram of message reception according to an illustrative embodiment of the present invention.

Reference is directed to FIG. 6, which is a functional block diagram of a message reception process according to an illustrative embodiment of the present invention. This diagram illustrates the system message capture functions and processes where the system selectively transcribes a portion of the messages received through a communications channel. This illustrative embodiment also presents one arrangement of the distributions of functions carried out in the processes, which is not the only distribution. This embodiment employs the audio feed source as the point of interface with the transcription processor. Limiting the number of messages transcribed is useful where system resources are limited, or where there is a significant variable cost in transcribing voice to test. A message 140 is received from a channel, which may either be a radio receiver or a network connection, and this message is coupled 156 to an audio feed source 142 type of network terminal. The messages include voice content, but may also include digital information concerning the message as well as information about the receiving device 140. The audio feed source 142 extracts the voice content and samples it to a digital audio file, which is transferred 158 to an audio file database 146 according to an Internet address or URL. Thus, the audio file copy of the voice content is available for recall from the URL by any network-connected device made aware of its existence. The audio feed source then sends a directory packet 160, comprising the channel ID, the time of capture, and the URL of the audio file, along with certain other data related to the capture and system addressing, to the client server 144.

Upon receipt of the directory packet 160 by the client server 144 in FIG. 6, the client server 144 sends the directory packet 164 to a directory packet database 150 in the routine fashion as discussed in the Inventors' Prior Patents. The system then addresses the question of whether or not to transcribe the voice content into textual data. This is because it is not always useful, efficient, or cost effective to transcribe every message. This aspect of the processing is accomplished using a transcribe yes/no process 154, which advises the client server 144 whether or not to transcribe each message. In this embodiment, the transcribe yes/no decision is based on the duration of the message, but it is to be understood that the transcribe Y/N decision could be based on a wide range of metrics. For example, the Yes/No transcription question could be based on the following concepts, or combinations thereof, as well as other factors known to those skilled in the art:
  (a) duration of voice content;
  (b) channel's primary function (e.g. fire dispatch, fire tactical, emergency management, railroad, utilities, etc);
  (c) time of day (such as "only transcribe during overnight hours, so people may be alerted at home to events");
  (d) "heat signature" based on unusual levels of channelactivity;
  (e) channel ID (for example, transcription may be restricted to specific channels received on the same scanner, or different rules/criteria may apply to different channels);
  (f) the number of client terminal subscribed to listen to a particular channel, which may indicate a high level of interest in the voice content being broadcast.

Now, continuing in FIG. 6, the client server 144 sends the channel ID and duration 166 to the transcribe Y/N process 154, which compares the length of the message to the minimum duration threshold applicable to this message, or channel, or user. The transcribe Y/N process 154 then returns a transcribe yes/no message 166 back to the client server 144. If the decision is to not transcribe, the task is completed. If the transcribe Y/N decision is to transcribe, the system continues processing the message.

Once the client server 144 in FIG. 6 has been advised to transcribe 168 a message by the transcribe Y/N process 154, the client server 144 submits the message channel ID 170 to the keyword database 152 requesting a list of keywords for comparison with the voice content of the message. Note that at this point in the process, the voice content has not yet been transcribed. The keyword database 152 responds to this request with a list of keywords 172 according to the channel ID and user requirements. With this information in hand, the client server 144 submits the keywords and the transcribe Y/N decision 174 back to the audio feed source 142 for further handling. Please refer to the discussion of FIG. 7 for such continued processing analysis.

Figure 7:
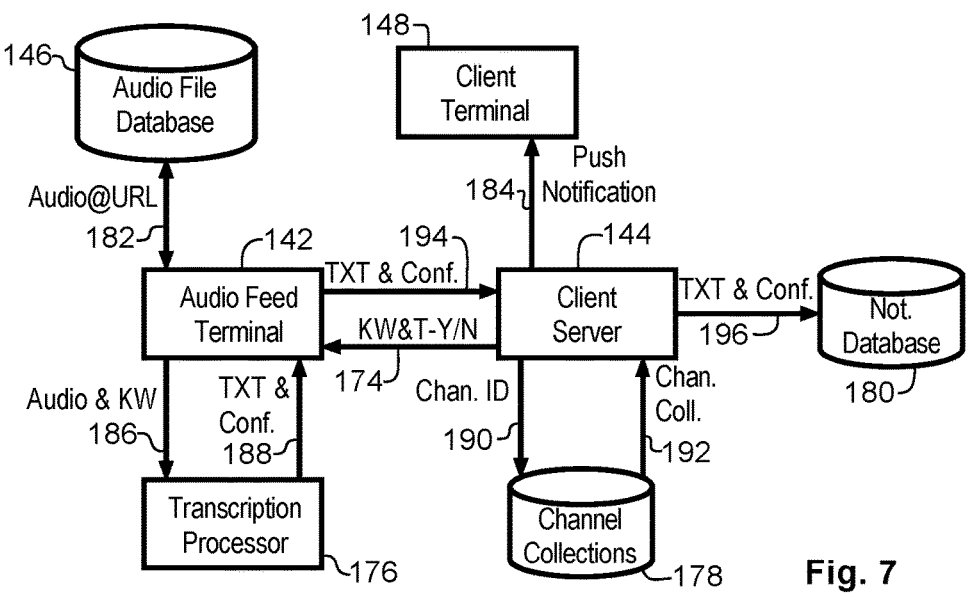
FIG. 7 is a functional block diagram of message transcription and notification according to an illustrative embodiment of the present invention.

Reference is directed to FIG. 7, which is a functional block diagram for message transcription and notification in a system according to an illustrative embodiment of the present invention. FIG. 7 corresponds with FIG. 6, and particularly addresses the functions utilized in transcribing voice content and generating a notification to client terminals. Continuing from FIG. 6, the client server 144 has sent the keywords and transcribe Y/N decision 174 back to the audio feed source 142. Upon receipt of this information, the audio feed source 142 recalls the audio file 182 from the audio file database 146, and forwards the audio file and keywords 186 to the transcription processor 176. The transcription processor 176 transcribes the audio file and produces textual data as accurately as the transcription technology will allow. In this embodiment, the transcription processor 176 is also capable of estimating the likelihood of a match between the textual data and the keywords, together with generating a confidence factor indicating the likelihood of a match with particular keywords. This information is transferred 188 back to the audio feed source 142. Note that with the foregoing arrangement, the network audio feed terminal 142 manages access to the transcription processor 176. In other embodiments, access to the transcription processor is controlled by the client server 144. Once the client server 144 has received the transcribed text, keywords, and confidence factors 194 from the audio feed source 142, the notification is generated and send 184 to the client terminal(s) 148. In this embodiment, the notification 184 is a push notification so that the client terminal need not access or poll any other network location in order to receive the notification. The client server 144 also sends this information 196 to a notification database to retain a record thereof.

Figure 8:
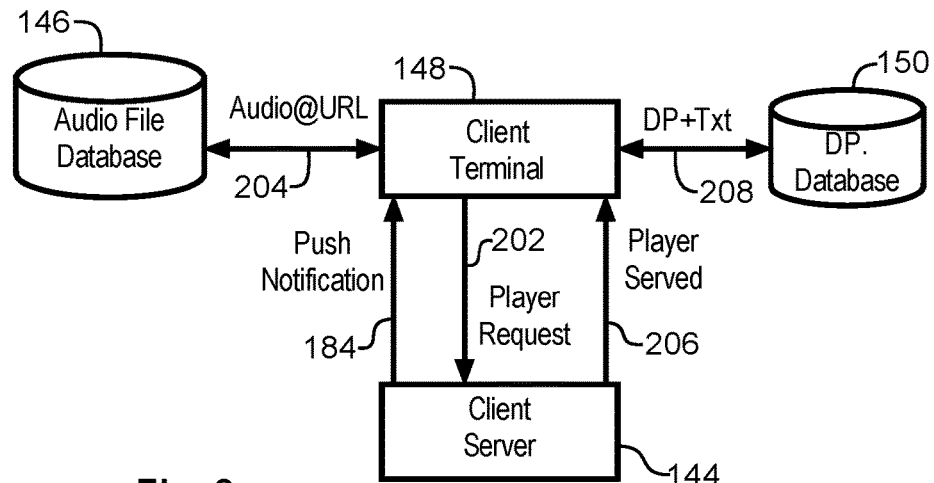
FIG. 8 is a functional block diagram of message playback according to an illustrative embodiment of the present invention.

Reference is directed to FIG. 8, which is a functional block diagram of message playback according to an illustrative embodiment of the present invention. FIG. 8 corresponds with FIGS. 6 and 7. In FIG. 8, the client server 144 has sent the push notification 184 to the client terminal 148, thusly making the client terminal aware that the message contains useful information. In this embodiment, the notification includes a hypertext reference link to a web-served player, so all the user need do to access the message is to select the reference link. When this event occurs, the client terminal sends a player request 202 to the client server, and the client server responds by serving the player 206, which is configured to auto-play the present message on the channel ID. Note that the client terminal 148 can also access the directly packet database 150, which was populated earlier by the client server, to complete all the display parameters in the served player. Refer to FIG. 2 for an exemplary embodiment of that information.

Figure 9:
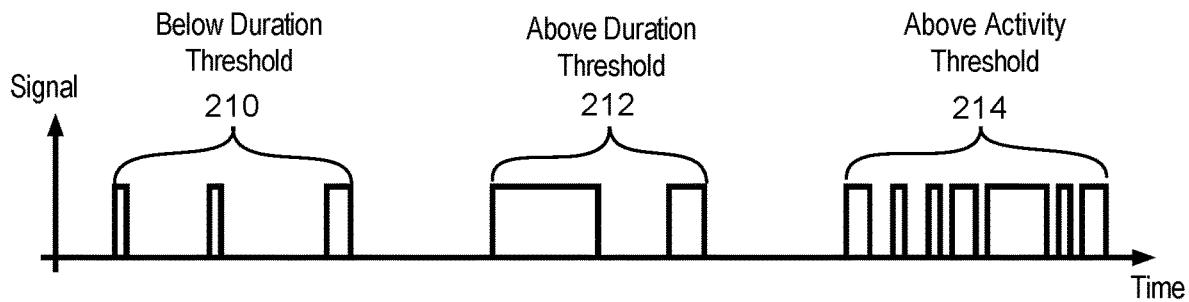
FIG. 9 is a timing diagram of plural message reception according to an illustrative embodiment of the present invention.

Reference is directed to FIG. 9, which is a timing diagram of plural message reception according to an illustrative embodiment of the present invention. As noted hereinbefore, the decision of whether or not to transcribe voice content in a message carries certain considerations. In real-world systems, there are very large volumes of messages, and most of them do not contain useful information. One of the benefits of the presently disclosed system is that it provides notifications for messages likely to contain useful information. Another factor is that presently, the process of transcribing large volumes of messages carries costs both in terms of economics where the transcriptions service charges a fee, and in terms of network resource consumption, as well as system architecture scalability. The inventors hereof, having vast experience in channel scanning system and monitoring, have determined that both message duration and message frequency are important factors in determining whether a message may contain useful information. Public safety agencies, government entities, and business entities typically use shorthand terms and phrases for routine transmissions. Most of these do no contain information useful to users. However, when such services begin transmitting longer messages, or messages in rapid succession, this is usually due to some non-routine activity, which often times corresponds to useful information to users. For example, firemen arriving at a fire scene and while actually fighting the fire tend to speak more thoroughly and quickly.

FIG. 9 illustrate message timing diagrams that correspond to the foregoing concepts of message duration and frequency. In section 210, the messages have a short duration and are spaced in time such that the frequency of messages is not high. In section 212, the messages have longer duration, although they are not occurring in rapid succession. The system in this example is prompted to transcribe these messages because of their longer duration. In section 214, the messages are not individually long enough to trigger transcription, however they are occurring in rapid succession, so the system submits them for transcription. These techniques increase the likelihood that useful information transmissions are identified while still controlling the use of excessive transcriptions.

Figure 10:
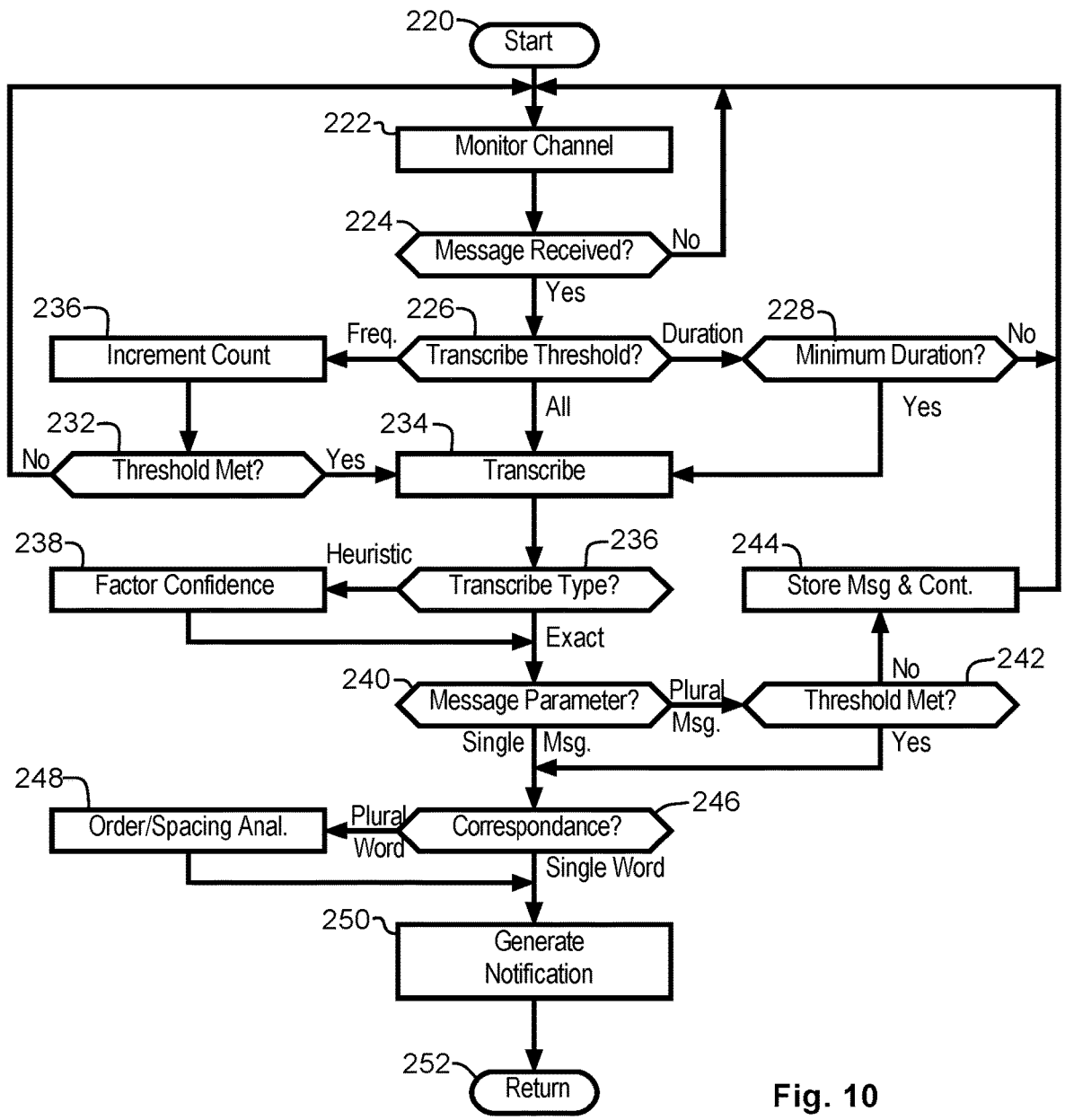
FIG. 10 is a process flow diagram of message transcription evaluation according to an illustrative embodiment of the present invention.

Reference is directed to FIG. 10, which is a process flow diagram of message transcription evaluation according to an illustrative embodiment of the present invention. This illustrative embodiment flow diagram provides further insight into the transcription and notification processes of the present teachings. The process begins at step 220 and proceeds to step 222 where channel monitoring is undertaken, as described hereinbefore. At step 224, the system tests to determine if a present message has been received. If not, flow returns to step 222 for continued monitoring. If there is a present message at step 224, flow proceeds to step 226 to determine what type of transcription threshold applies to this message, channel, and user. If the duration is based on minimum message duration, then flow proceeds to step 228 to test the message duration against the threshold. If the message it too short, flow returns to step 222 for continued monitoring. If the message duration is long enough at step 228, then flow proceeds to step 234, where the transcription processing begins.

On the other hand, at step 226, if the transcription threshold is based on message frequency, the flow proceeds to step 236 where a counter, which is initially set to zero, is incremented. Flow then proceeds to step 232, where a test is made to determine if there have been sufficient messages in a sufficiently short time interval to satisfy the frequency test. Of course, the first message will never satisfy that test, so flow returns to step 222 for continued monitoring. But, if the test at step 232 is the second, or greater number, of message in a time interval, then the threshold may be met at step 232 and flow proceeds to step 234 where the transcription process begins. Note that the number of message and the duration of the test interval are programmable parameters that may be adjusted as practical experience is gained.

In any event, once the process flow in FIG. 10 has reached step 234, then the message is transcribed by the transcription processor. Flow then proceeds to step 236, which is a test to determine what transcription type is to be applied, and this may be based on either the channel ID, client terminal, message content, or system preference setting. If a heuristic transcription has been applied, then the process goes to step 238 where the confidence factor is evaluated and applied to the data packet, such as the directory packet, for the present message. Flow then goes to step 240. If, at step 236, an exact transcription has been produced, meaning that only textual data is retuned from the transcription processor, then flow goes directly to step 240, where the message number parameter is evaluated.

Step 240 evaluates whether the present message is to be evaluated individually for correspondence with keywords, or whether plural messages are to be evaluated. If plural messages are to be evaluated, then flow goes to step 242, which is a test to determine of the threshold number of plural messages has been met. If not, then the message is stored at step 244 and the process continues to step 222 to monitor for a subsequent message. On the other hand, at step 242, is the threshold number of message has been satisfied, then flow continues to step 246. Returning now to step 240, if the message number parameter is a single message, flow proceeds to step 246, to test for a correspondence between the textual data and the keywords associated with the present message.

At step 246, the comparison processor test for correspondence between the keywords associated with a message and the textual data produced by the transcription processor. The system provides and option to compare single words or plural words. If a single word, or single contiguous phrase, has been specified, then flow proceeds to step 250 where the notification is generated by the system. On the other hand, at step 246, if the correspondence is to be with plural words, flow proceeds to step 248. Step 248 conducts an analysis as to the order and spacing, either in time or position, of the matching keywords. If the parameters are satisfied, then flow proceeds to step 250, where the notification is generated. The process then returns at step 252.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of monitoring over-the-air broadcasts of radio channels using a scanning radio receiver and automatically providing selective notifications to users through a network that messages containing useful information have been received, wherein the messages comprise voice content, the method comprising the steps of:
   defining one or more keywords having an association with useful information;
   monitoring an over-the-air broadcast radio channel that communicates intermittent broadcasts of periodic messages containing voice content using a scanning radio receiver according to a channel identity, by a network audio feed terminal;
   transcribing voice content in a present message into textual data by a transcription processor;
   comparing the textual data with the keywords by a comparison processor, and upon identifying a correlation therebetween,
   automatically generating a notification indicating receipt of the present message, wherein the notification includes the channel identity, a time the present message was received, and a network address at which the voice content has been stored, thereby enabling users that receive the notification to selectively recall and reproduce the voice content, and also subsequently monitor the radio channel in real time for related follow-up message transmissions according to the channel identity and to thereby receive related future voice content.

2. The method of claim 1, and wherein:
   the notification includes a portion of the textual data, and wherein said providing a notification step further comprises:
   delivering the notification to a client terminal through the network, and
   displaying a portion of the textual data by the client terminal.

3. The method of claim 1, and wherein:
   the notification includes the voice content of the present message, and wherein said providing a notification step further comprises:
   delivering the notification to a client terminal through the network, and
   reproducing the voice content of the present message by the client terminal.

4. The method of claim 1, and wherein:
   the useful information is communicated through the radio channel by a public safety service, a government agency, or a business entity.

5. The method of claim 4, and wherein the association of the keywords with the useful information is suggestive of activities presently being undertaken by the public safety service, the government agency, or the business entity using the radio channel.

6. The method of claim 1, and wherein:
the channel identity includes at least one of; a radio frequency, a radio system identifier, a squelch control code, a radio system talk group identity, an Internet uniform resource locator, a network address, and a storage location.

7. The method of claim 1, and wherein said identifying a correlation step further comprises the step of:
identifying a match between one of keywords and a portion of the textual data.

8. The method of claim 1, and wherein said identifying a correlation step further comprises the step of:
locating a match between plural keywords and a contiguous portion of the textual data.

9. The method of claim 1, and wherein said identifying a correlation step further comprises the step of:
locating plural matches between plural keywords and plural corresponding portions of the textual data.

10. The method of claim 1, and wherein said identifying a correlation step further comprises the step of:
determining a likelihood of a match between one of the keywords and a non-identical portion of the textual data, and
including the one of the keywords in the notification.

11. The method of claim 10, further comprising the step of:
sending the notification to a client terminal if the likelihood of a match exceeds a predetermined threshold.

12. The method of claim 10, and further comprising the steps of:
generating a confidence factor indicating a numeric probability of the likelihood of the match, and including the confidence factor in the notification.

13. The method of claim 1, further comprising the steps of:
transcribing voice content in a subsequent message into subsequent textual data by the transcription processor, and wherein said identifying a correlation step further comprises the step of;
locating a match between a first keyword and a portion of the textual data, and locating a second match between a second keyword and the subsequent textual data.

14. The method of claim 1, further comprising the steps of:
recalling, by the client terminal, the voice content of the present message according to the network address, and reproducing the voice content.

15. The method of claim 14, further comprising the steps of:
automatically launching a message player upon receipt of the notification by the client terminal, to thereby accomplish said reproducing said voice content step.

16. The method of claim 14, and wherein the network audio feed terminal continues receiving subsequent messages from the radio channel, and further comprising the steps of:
reproducing subsequent voice content by the client terminal if the subsequent messages include corresponding subsequent notifications that indicate a match with at least one of the keywords.

17. The method of claim 14, and wherein the network audio feed terminal continues receiving subsequent messages from the radio channel, and further comprising the steps of:
reproducing subsequent voice content by the client terminal, and
adjusting a playback volume of the reproduced audio content for subsequent messages that include corresponding subsequent notifications that indicate a match with at least one of the keywords.

18. The method of claim 1, further comprising the step of:
sending the notification to a client terminal.

19. The method of claim 18, and wherein:
the notification includes the channel identity, comprising at least one of a radio frequency, a radio system identifier, a squelch control code, a radio system talk group identity, a network address, a network storage location and a uniform resource location.

20. The method of claim 18, and wherein:
said sending the notification step is accomplished using a network push notification selected from an SMS text message, an email message, a social media chat message, and a wireless device application program transfer message.

21. The method of claim 1, and wherein:
said transcribing voice content into textual data step further includes transcribing voice content over plural messages, and wherein
said comparing the textual data with keywords step further includes comparing the textual data from the plural messages by the comparison processor, and wherein
said identifying a correlation step further includes the step of identifying a correlation between the keywords and textual data derived from more than one of the plural messages.

22. The method of claim 1, further comprising the steps of:
measuring a duration of the voice content in the present message, and wherein
said generating a notification step is performed only if the duration exceeds a predetermined minimum duration.

23. The method of claim 22, and further comprising the step of:
adjusting the predetermined minimum duration to control the quantity of messages transcribed by the transcription processor.

24. The method of claim 1, and wherein the radio channel is associated with an additional channel carrying additional messages, which may also containing useful information transmitted as voice content, the method comprising the further step of:
providing within the notification, an identity of the additional channel.

25. The method of claim 1, and further comprising the step of:
defining one or more negative keywords associated with non-useful information;
comparing the textual data with the negative keywords, and
blocking said generating a notification step upon identification of the negative keyword match.

26. A system for monitoring over-the-air broadcasts of radio channels using a scanning radio receiver and automatically providing selective notifications to users through a network that messages containing useful information, transmitted in the form of voice content, have been received, the system comprising:

a network audio feed terminal connected to a scanning radio receiver that monitors an over-the-air broadcast radio channel that communicates intermittent broadcasts of periodic messages, having a channel identity, wherein said radio channel transmits a present message that includes voice content;

a transcription processor connected to the network to receive and transcribe said voice content into textual data;

a comparison processor connected to the network to receive said textual data, and compare said textual data with one or more keywords that are associated with useful information, and upon identifying a correlation therebetween, automatically generate a notification that indicates receipt of said present message, wherein said notification includes said channel identity, a time said present message was received, and a network address at which said voice content has been stored, thereby enabling users that receive said notification to selectively recall and reproduce said voice content, and also subsequently monitor said radio channel in rail time for related follow-up message transmissions according to said channel identity and to thereby receive related future voice content.

27. The system of claim 26, and wherein:
said network audio feed terminal stores said voice content from said present message in an audio file at a network address, and generates a directory packet that includes said channel identity, said network address, and a time of capture of said audio file, and wherein
said transcription processor receives said directory packet, and in response thereto, recall said audio file from said network address.

28. The system of claim 26, and further comprising:
a client server connected to the network to receive said notification, and wherein
said notification further includes a portion of said textual data, and wherein
said client server delivers said notification to a client terminal through the network, and said client terminal displays a portion of said textual data.

29. The system of claim 26, and further comprising:
a client server connected to the network to receive said notification, and wherein
said notification further includes said voice content of said present message, and wherein
said client server delivers said notification to a client terminal through the network, and said client terminal reproduces said voice content.

30. The system of claim 26, and wherein:
said useful information is communicated through said radio channel by a public safety service, a government agency, or a business entity.

31. The system of claim 30, and wherein said correlation of said keywords with said useful information is suggestive of activities presently being undertaken by said public safety service, said government agency, or said business entity using said radio channel.

32. The system of claim 26, and wherein:
said radio channel identity includes at least one of; a radio frequency, a radio system identifier, a squelch control code, a radio system talk group identity, an Internet uniform resource locator, a network address, and a storage location.

33. The system of claim 26, and wherein:
said correlation is identified as a match between one of said keywords and a portion of said textual data.

34. The system of claim 26, and wherein:
said correlation is identified as a match between a plurality of said keywords and a contiguous portion of said textual data.

35. The system of claim 26, and wherein:
said correlation is identified as plural matches between a plurality of said keywords and a plurality of corresponding portions of said textual data.

36. The system of claim 26, and wherein:
said correlation is identified as a likelihood of a match between one of said keywords and a non-identical portion of said textual data, and wherein
said one of said keywords is included in said notification.

37. The system of claim 36, and wherein:
said notification is sent through the network to a client terminal if said likelihood of a match exceeds a predetermined threshold.

38. The system of claim 36, and wherein:
said comparison processor generates a confidence factor indicating a numeric probability of said likelihood of the match, and wherein
said confidence factor is included in said notification.

39. The system of claim 26, and wherein:
said transcription processor transcribes voice content in a subsequent message into subsequent textual data, and wherein
said correlation is identified as a match between a first keyword and a portion of said textual data, and a second match between a second keyword and said subsequent textual data.

40. The system of claim 26, and wherein:
said voice content of said present message, a time of transmission, and said channel identity are stored at a network address by said network audio feed source, and wherein
said notification includes said network address, and is sent through the network to a client terminal.

41. The system of claim 40, and wherein:
said client terminal recalls said voice content of said present message according to said network address, and reproduces said voice content.

42. The system of claim 41, and wherein:
said client terminal automatically launches a message player upon receipt of said notification, to thereby reproduce said voice content.

43. The system of claim 41, and wherein:
said network audio feed terminal continues to receive subsequent messages from said radio channel, and wherein
said client terminal reproduces subsequent voice content if said subsequent messages include corresponding subsequent notifications that indicate a match with at least one of said keywords.

44. The system of claim 41, and wherein:
said network audio feed terminal continues to receive subsequent messages from said radio channel, and wherein
said client terminal reproduces subsequent voice content, and wherein
said client terminal adjusts a playback volume of said reproduced audio content for subsequent messages that include corresponding subsequent notifications that indicate a match with at least one of said keywords.

45. The system of claim 26, and wherein:
said notification is sent through the network to a client terminal.

46. The system of claim 45, and wherein:
said notification includes the channel identity, which includes at least one of a radio frequency, a radio system identifier, a squelch control code, a radio system talk group identity, a network address, a network storage location, and a uniform resource location.

47. The system of claim 45, and wherein:
said notification is sent as a network push notification selected from an SMS text message, an email message, a social media chat message, and a wireless device application program transfer message.

48. The system of claim 26, and wherein:
said transcription processor transcribes voice content over plural messages, and wherein
said comparison processor compares said textual data from said plural messages with said keywords, and wherein
said comparison processor identifies a correlation between said keywords and textual data derived from more than one of said plural messages.

49. The system of claim 26, and wherein:
said network audio feed terminal measures a duration of said voice content in said present message, and wherein
said notification is generated only if said duration exceeds a predetermined minimum duration.

50. The system of claim 49, and wherein:
said comparison processor adjusts said predetermined minimum duration to control a quantity of messages compared with said keywords.

51. The system of claim 26, and wherein:
said radio channel is associated with an additional channel that carries additional messages, which may also contain useful information transmitted as voice content, and wherein
said notification includes an identity of said additional channel.

52. The system of claim 26, and wherein:
said keywords further include one or more negative keywords associated with non- useful information, and wherein
said comparison processor compares said textual data with said negative keywords, and blocks said generation of said notification upon identification of a negative keyword match.

* * * * *